(12) United States Patent
Robinson et al.

(10) Patent No.: US 8,346,191 B2
(45) Date of Patent: Jan. 1, 2013

(54) WIRELESS MEASUREMENT TRANSMITTER WITH REPLACEABLE MODULE

(75) Inventors: Cory M. Robinson, Mayer, MN (US); Chad M. McGuire, Shakopee, MN (US); Hun Chhuoy, Savage, MN (US)

(73) Assignee: Rosemount Inc., Eden Prairie, MN (US)

( * ) Notice: Subject to any disclaimer, the term of this patent is extended or adjusted under 35 U.S.C. 154(b) by 77 days.

(21) Appl. No.: 12/971,089

(22) Filed: Dec. 17, 2010

(65) Prior Publication Data

US 2012/0157018 A1    Jun. 21, 2012

(51) Int. Cl.
*H03C 1/62* (2006.01)
(52) U.S. Cl. ...................................... 455/115.1; 429/96
(58) Field of Classification Search ............... 455/115.1, 455/127.1, 128, 572; 429/96
See application file for complete search history.

(56) References Cited

U.S. PATENT DOCUMENTS

| 7,812,480 B2 | 10/2010 | Datta et al. | |
|---|---|---|---|
| 2006/0244315 A1 | 11/2006 | Kogan et al. | 307/150 |
| 2007/0201192 A1 | 8/2007 | McGuire et al. | 361/600 |
| 2008/0186656 A1 | 8/2008 | Striano | 361/625 |
| 2008/0274772 A1 | 11/2008 | Nelson et al. | 455/572 |
| 2009/0236912 A1 | 9/2009 | Datta et al. | 307/66 |

FOREIGN PATENT DOCUMENTS

WO    WO 2004/098014    11/2004

OTHER PUBLICATIONS

International Search Report and Written Opinion for PCT Application No. PCT/US2011/063891, dated Mar. 21, 2012, 11 pages.

*Primary Examiner* — Lee Nguyen (74) *Attorney, Agent, or Firm* — Westman, Champlin & Kelly, P.A.

(57) ABSTRACT

A measurement transmitter includes a main housing body with a first cavity closed by a first cover and a second cavity closed by a second cover. A measurement circuit assembly in the first cavity includes power and service communication conductors that extend through the main housing body to contacts in the second cavity. A replaceable module plugs into the contacts in the second cavity and includes a primary battery and a service communication connector. The service communication connector is exposed for connection to service equipment by removal of the second cover.

16 Claims, 8 Drawing Sheets

WIRELESS MEASUREMENT TRANSMITTER WITH REPLACEABLE MODULE

BACKGROUND OF THE INVENTION

The present invention relates to wireless measurement transmitters, and in particular to wireless measurement transmitters that have circuit settings that are remotely settable by temporary connection with wires to portable service equipment such as a hand held communicator. The setting of circuit settings frequently takes place in an industrial plant environment where an atmosphere may be present that is explosive, corrosive or both. When a wireless measurement transmitter cover is removed to perform circuit settings or other service operations, the measurement electronics can be exposed to the atmosphere, resulting in degradation or damage to the electronics, or risk of an electrical spark in an explosive atmosphere. There can also be a risk of an electrical spark in an explosive atmosphere when a wireless transmitter cover is removed in order to replace a primary battery.

With some existing measurement transmitters, in order to safely perform service operations, extra steps may be required such as disconnecting the device from the process and removing it to a safe area.

SUMMARY OF THE INVENTION

A measurement transmitter for use in an industrial process to measure a process variable includes a housing assembly. The housing assembly includes a main housing body with a first cavity closed by a first cover and a second cavity closed by a second cover. A measurement circuit assembly in the first cavity includes power and service communication conductors that extend through the main housing body to contacts in the second cavity. A measurement sensor is connected to the measurement circuit.

A replaceable module plugs into the contacts in the second cavity. The replaceable module includes a primary battery and a service communication connector. The service communication connector is exposed for connection to service equipment by removal of the second cover.

DETAILED DESCRIPTION OF ILLUSTRATIVE EMBODIMENTS

In the embodiments described below, a wireless measurement transmitter for use in an industrial process is disclosed that includes a replaceable module. The replaceable module includes a primary battery that energizes the wireless measurement transmitter and also includes a service communication connector. In one configuration, the primary battery is a battery that is not rechargeable and that is disposable. The replaceable module slides into a keyed cavity in a main housing body of the wireless measurement transmitter. The service communication connector protrudes from the cavity for convenient connection of test hooks during service operations. A measurement circuit assembly is installed in a separate sealed first cavity.

The first cavity can remain sealed from a surrounding industrial atmosphere while service operations and battery replacement are taking place. Service operations can be performed by removing a first cover from the first cavity without exposing the measurement circuit assembly to the surrounding industrial atmosphere which may be contaminated or explosive.

In some embodiments, the measurement circuit assembly includes a wireless antenna, and the wireless antenna radiates a wireless communication signal through the first cover and housing, which are formed of a material such as plastic resin that is transparent to the wireless communication signal. In other embodiments, the wireless communication signal includes an industrial communication protocol such as WirelessHART.

Figure 1A:
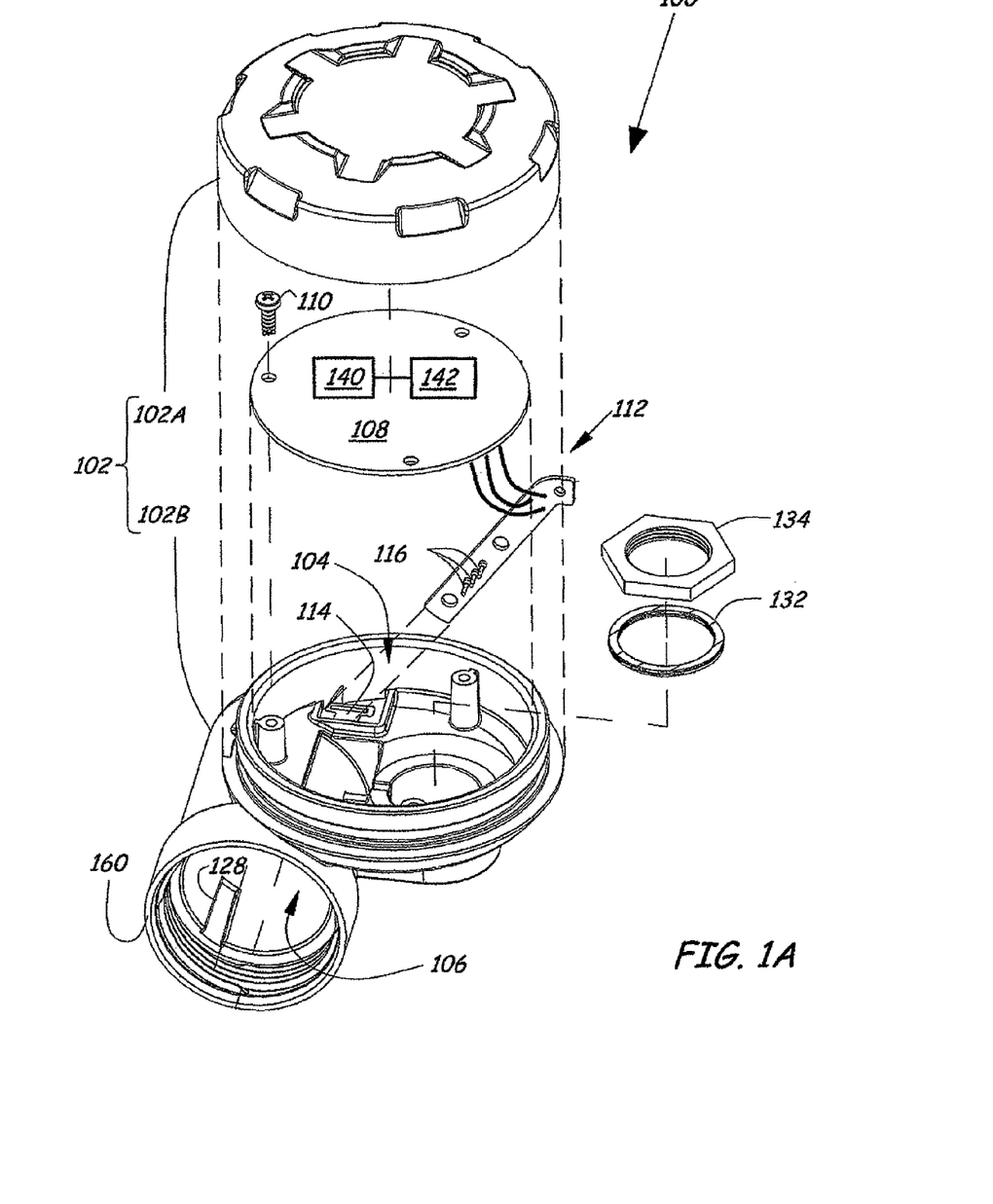
FIGS. 1A, 1B are exploded drawings of an upper portion (FIG. 1A) and a lower portion (FIG. 1B) of a wireless measurement transmitter.
Figure 1B:
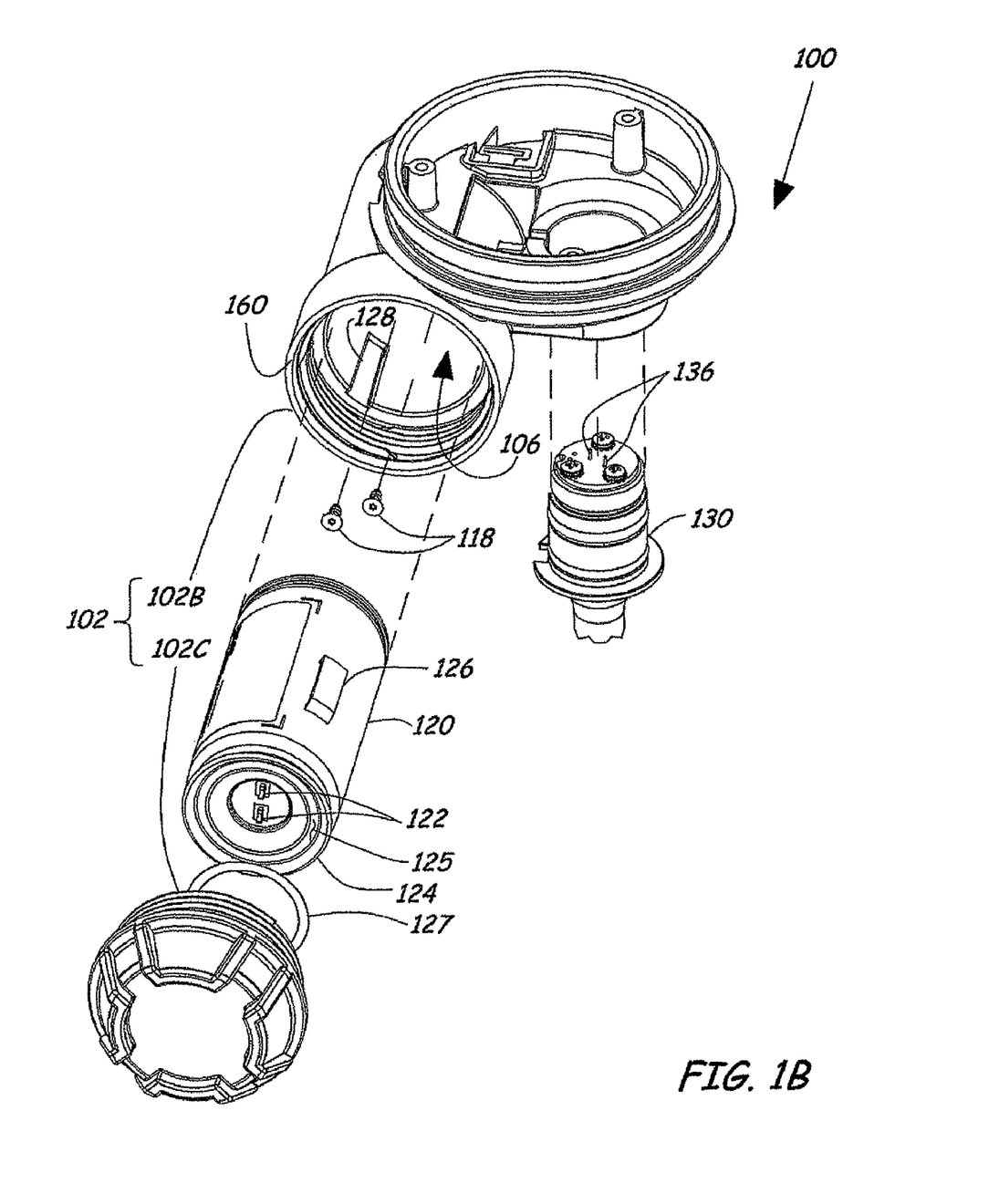

FIGS. 1A, 1B are exploded drawings of an upper portion (FIG. 1A) and a lower portion (FIG. 1B) of a wireless measurement transmitter 100. The wireless measurement transmitter 100 includes a housing assembly 102 that includes parts 102A, 102B, 102C. The housing assembly 102 has a main housing body 102B (shown in both FIGS. 1A, 1B), a first cover 102A and a second cover 102B. The main housing body 102B includes a first cavity 104 that is closed by the first cover 102A. The main housing body 102B includes a second cavity 106 that is closed by the second cover 102C. The covers 102A, 102C are threaded with threads that engage mating threads on the main housing body 102B. The use of two covers 102A, 102C permits service operations (e.g., primary battery replacement, adjustment of settings) by removing the second cover 102C without exposing electronic components disposed in the first cavity 104 to contamination from the surrounding industrial environment, and without exposing the first cavity to the atmosphere or the surrounding industrial environment.

According to one embodiment, the first cover 102A is formed of a material, such as plastic resin, that is electrically insulating and substantially transparent to transmission of a wireless communication signal.

The wireless measurement transmitter 100 includes a measurement circuit assembly 108. The measurement circuit assembly 108 is disposed in the first cavity 104. The measurement circuit assembly 108 is secured by screws such as screw 110 to the main housing body 102B. The measurement circuit assembly 108 includes power and service communication conductors 112 that extend through an internal passage 114 in the main housing body 102B to contacts 116 in the second cavity 106. According to one embodiment, the contacts 116 (FIG. 1A) are secured in a fixed position in the second cavity 106 by screws 118 (FIG. 1B). According to another embodiment, the contacts 116 (FIG. 1A) are secured in a fixed position in the second cavity 106 by posts (not illustrated) that are molded as part of the main housing body 102B, and screws 118 are not needed in this embodiment. The posts are melted to deform them in order secure the contacts 116. According to one embodiment, the internal passage 114 is sealed to provide a barrier to the environment when the battery compartment is open.

The wireless measurement transmitter 100 has a replaceable module 120. The replaceable module 120 plugs into the contacts 116 in the second cavity 106. The replaceable module 120 includes a primary battery 150 (shown in FIG. 2). The replaceable module 120 also includes a service communication connector 122 that protrudes beyond the second cavity 106. The service communication connector 122 is accessible by removal of the second cover 102C for connection to external service equipment (not shown in FIGS. 1A, 1B, shown in FIG. 3). According to one embodiment, the replaceable module 120 includes a limiter circuit 152. The limiter circuit 152 is described in more detail below by way of an example described in more detail below in connection with FIG. 6.

Figure 2:
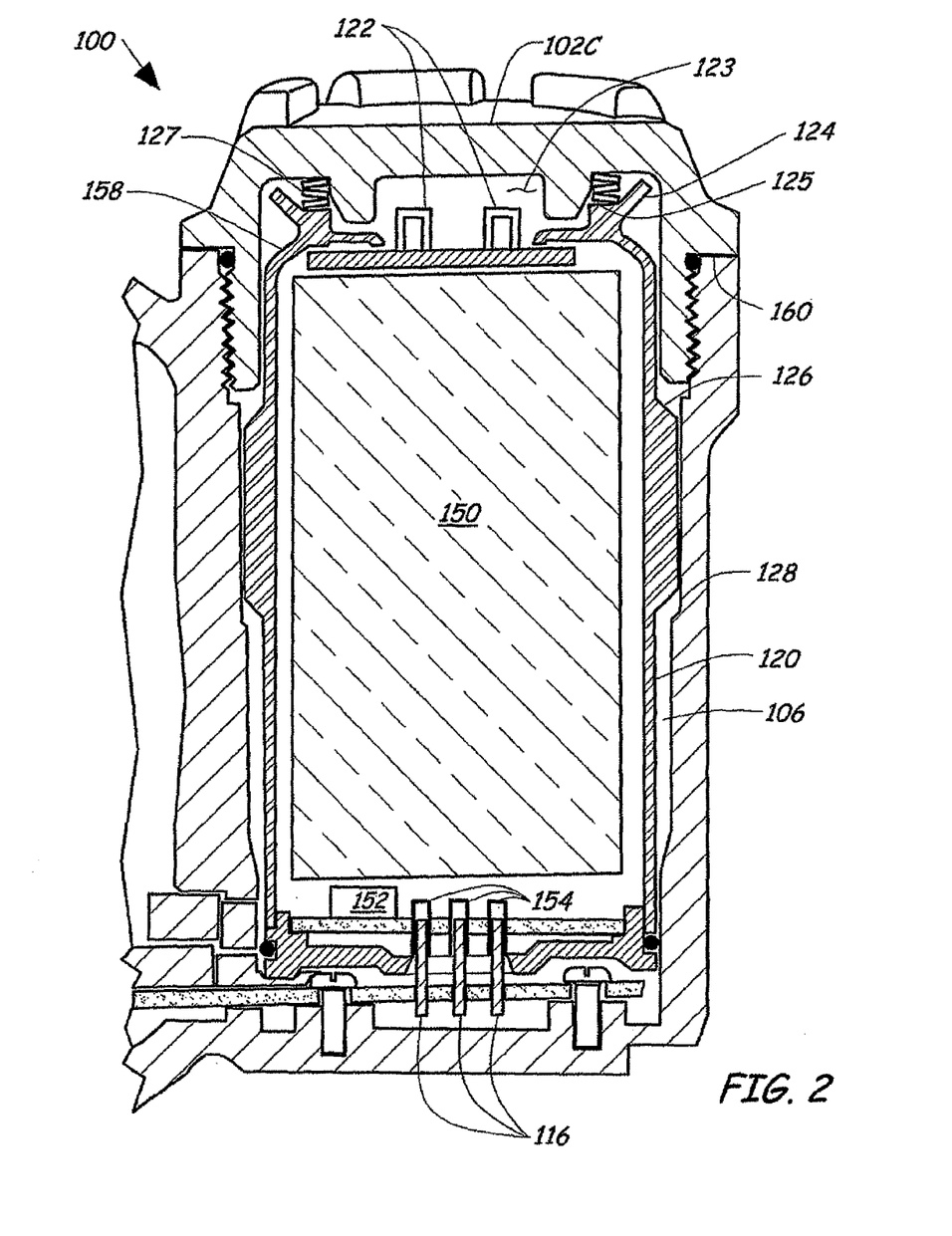
FIG. 2 is a cross sectional view of a portion of the wireless measurement transmitter of FIG. 1A, 1B.

According to one embodiment, the replaceable module 120 has a gripping ring 124 that protrudes beyond the second cavity 106 such that the gripping ring 124 is accessible by removal of the second cover 102C for gripping and pulling to unplug the replaceable module 120 from the contacts 116. According to one embodiment, the gripping ring 124 is adapted for gripping by opposed fingers of a person's hand. According to another embodiment, the second cover 102C has a cavity 123 (shown in FIG. 2) into which the service communication connector 122 and the gripping ring 124 protrude when the second cover 102C is installed on the main housing body 102B. The gripping ring 124 can be of any shape and is not limited to the shape shown in the Figures. According to yet another embodiment, the replaceable module 120 includes an annular thrust surface 125 which engages one or more springs 127 (also shown in a compressed condition in FIG. 2). The springs 127 are compressed between the thrust surface 125 and the second cover 102C when the second cover 102C is screwed into the main housing body 102B as shown in FIG. 2. According to one embodiment, the springs 127 are wave springs. According to another embodiment the springs 127 are Belleville washer springs. The gripping ring 124 protrudes to protect the service communication connector 122 from mechanical damage. The gripping ring 124 aligns the spring 127 for installation. The spring 127 provides a force to the module to keep the pins and sockets of the interconnect from moving relative to one another. The spring 127 is sized to provide more force than can be generated by the mass of the power module under the greatest expected acceleration due to vibration.

According to one embodiment, the replaceable module 120 has one or more protruding alignment tabs 126, and the second cavity 106 has one or more alignment slots 128 that engage with the alignment tabs 126 to control alignment when plugging the replaceable module into the contacts 116 in the second cavity 106.

According to one embodiment, the wireless measurement transmitter 100 has a measurement sensor 130. The measurement sensor 130 is attached to the main body housing 102B by a nut 134 and a sealing ring 132. According to another embodiment, the measurement sensor 130 is rigidly mounted to a process vessel (such as a pipe, valve, or tank) and the measurement sensor 130 supports the weight of the wireless measurement transmitter 100 and serves as a mounting for the wireless measurement transmitter 100. The service communication connector 122 is adapted for connection to test hooks that are wired to an external service device (not illustrated in FIGS. 1A, 1B) that can be used to perform service functions such as testing and programming the wireless measurement transmitter 100. The measurement sensor 130 includes electrical contacts 136 that are electrically connected to the measurement circuit assembly 108. According to one embodiment the electrical contacts 136 are directly secured to the measurement circuit assembly 108. According to another embodiment, the electrical contacts 136 are electrically connected to the measurement circuit assembly 108 by wire leads. In one embodiment, the measurement sensor 130 is an acoustic sensor. In another embodiment, the measurement sensor 130 is a pressure sensor.

According to one embodiment, the wireless measurement transmitter 100 senses an industrial process variable with the measurement sensor 130, and the measurement sensor 130 provides an electrical signal representative of the industrial process variable, via electrical contacts 136, to the measurement circuit assembly 108. The measurement circuit assembly 108 includes electronic measurement circuitry 140 that is energized by an electrical cell or battery in the replaceable module 120. The measurement circuit assembly 108 includes an antenna 142 that provides wireless communication of control information to a control system (not illustrated in FIGS. 1A, 1B) that is in a remote location. The antenna 142 radiates through the first cover 102A and the housing 102B that are transparent to wireless communication signals.

FIG. 2 is a cross sectional view of a portion of the wireless measurement transmitter 100 of FIG. 1A, 1B. The replaceable module 120 is installed in the second cavity 106. The second cavity 106 is dosed by the second cover 102C. The spring 127 is compressed between the second cover 102C and a thrust surface 125 on a module outer shell 158 of the replaceable module 120.

The replaceable module 120 has module contacts 154 that plug into the contacts 116 in the second cavity. The replaceable module 120 includes the primary battery 150 and a service communication connector 122 that protrudes beyond the rim 160 of the second cavity 106 when the second cover 102C is removed for service operations. With the second cover 102C removed, the service communication connector 122 is accessible for connection to service equipment using test hooks. The service communication connector 172 can be accessed for electrical connection without unplugging the replaceable module 120 from the contacts 116. The wireless measurement transmitter 100 is thus energized by the primary battery 150 during service operations.

Figure 3:
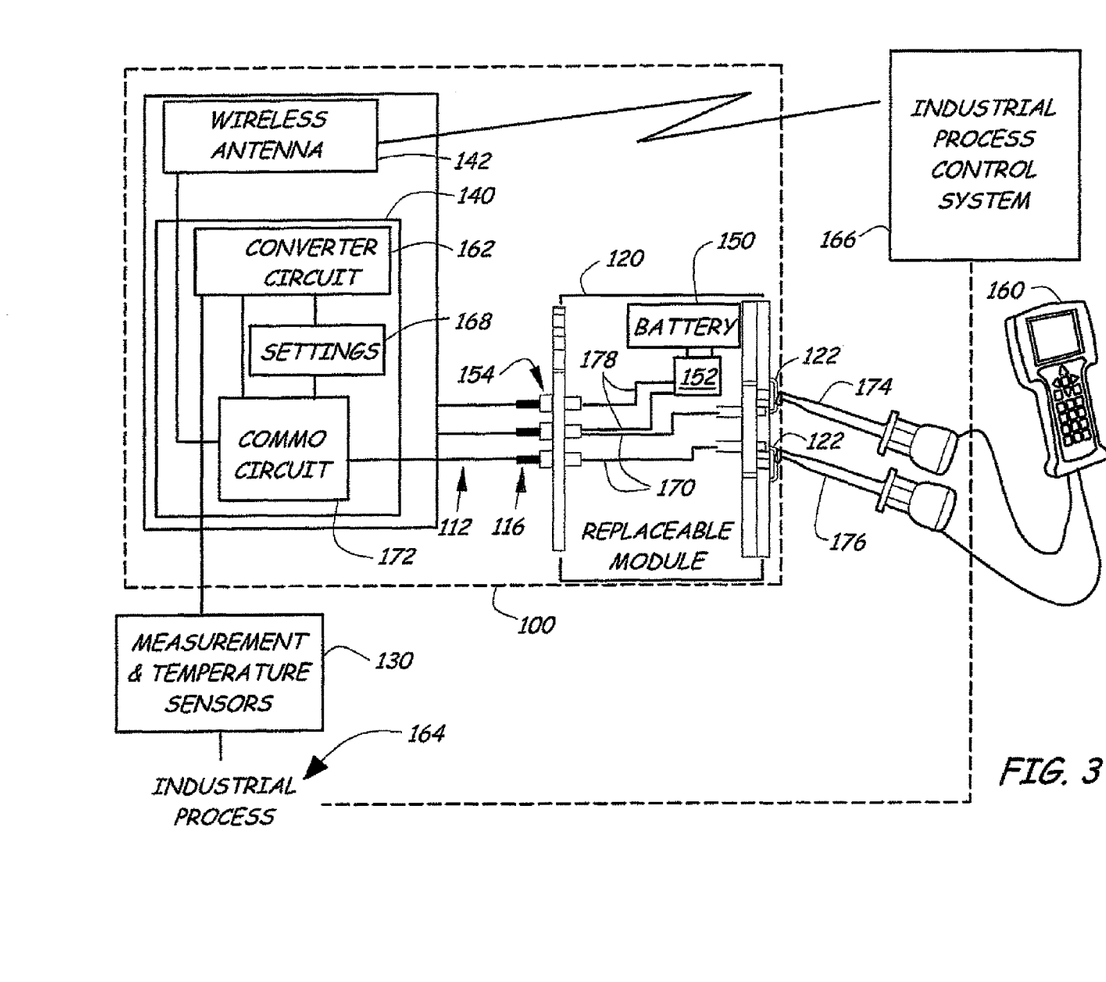
FIG. 3 is a schematic diagram of the wireless measurement transmitter connected to a measurement sensor and to handheld service equipment.

FIG. 3 is a schematic diagram of the wireless measurement transmitter 100 connected to the measurement sensor 130 and to handheld service equipment 160. The wireless measurement transmitter 100 includes the electronic measurement circuitry 140 and the wireless antenna 142.

The electronic measurement circuitry 140 includes a converter circuit 162. The converter circuit 162 receives an electrical output from the measurement sensor 130 that represents a process variable that is sensed from an industrial process 164. According to one embodiment, the measurement sensor 130 senses temperature (in addition to the process variable), and the converter circuit 162 diagnoses a process state as a function of the process variable and the temperature. The converter circuit 162 provides an output representative of the process state to a service communication circuit 172. The service communication circuit 172 communicates the process state to the wireless antenna 142. The wireless antenna 142 communicates process data wirelessly to an industrial process control system 166 that controls or monitors the industrial process 164. According to one aspect, the measurement sensor 130 is an acoustic sensor, and the process state includes an operational state of a steam vessel, e.g., normal steam vessel operation, plugged state in the steam vessel, or leaking state in the steam vessel depending on the combination of acoustic level and temperature.

The electronic measurement circuitry 140 includes stored settings 168. The stored settings 168 may be, for example, process variable range settings, calibration data setting, wireless frequency setting or other setting which controls the operation of the electronic measurement circuitry 140. According to one embodiment, the stored settings 168 are remotely adjustable by commands received from the industrial process control system 166 through the wireless antenna 142. According to another embodiment, the stored settings 168 are remotely adjustable by commands received from handheld service equipment 160 through the replaceable module 120. The service equipment 160 is connected with test hooks 174, 176 to the communication connector 122, and the communication connector 122 is connected by wiring 170 in the replaceable module 120 to the service communication circuit 172 in the electronic measurement circuitry 140. According to one embodiment, the service communications are communicated using a HART communication protocol. The primary battery 150 in the replaceable module 120 is connected by wiring 178 to energize the electronic measurement circuitry 140.

Figure 4A:
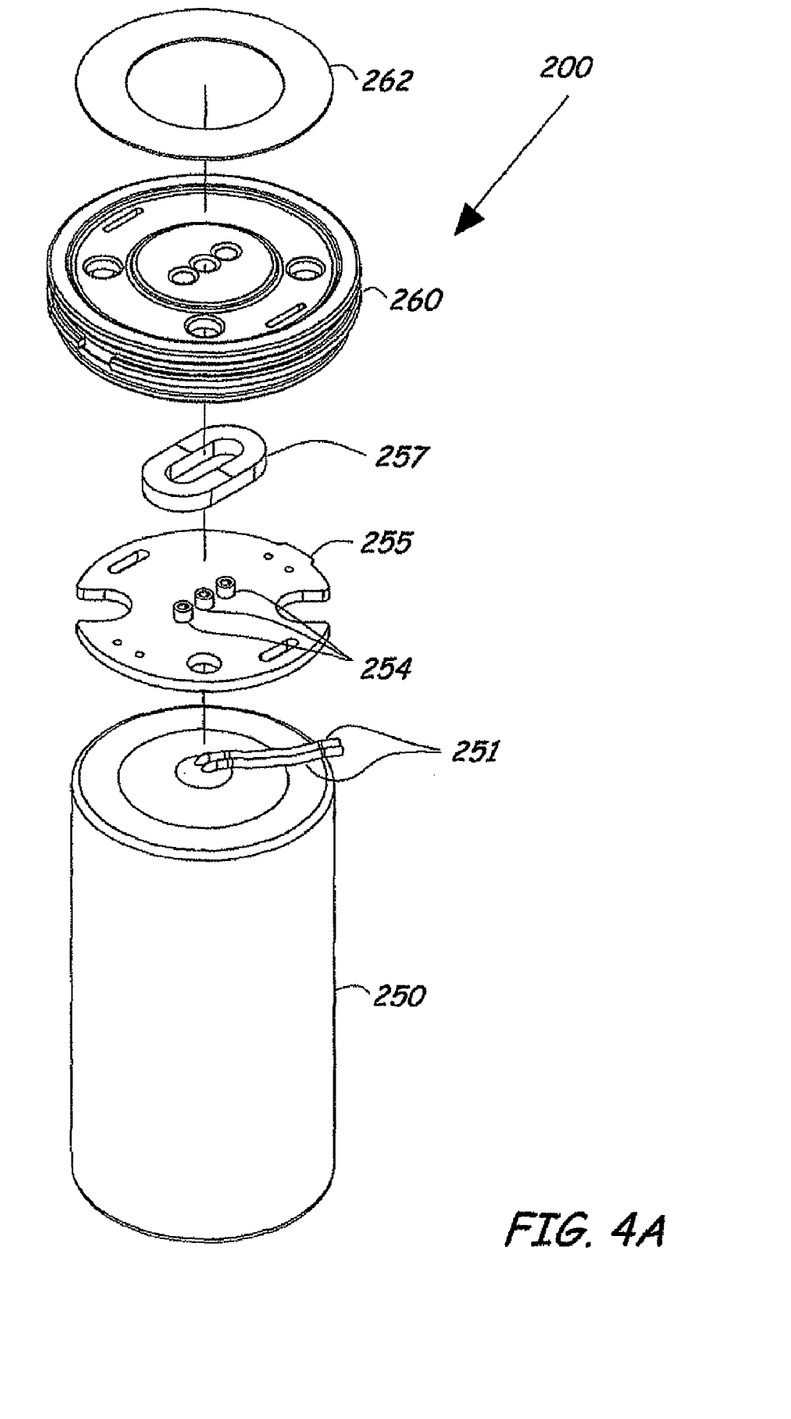
FIGS. 4A, 4B are exploded drawings of an exemplary replaceable module.
Figure 4B:
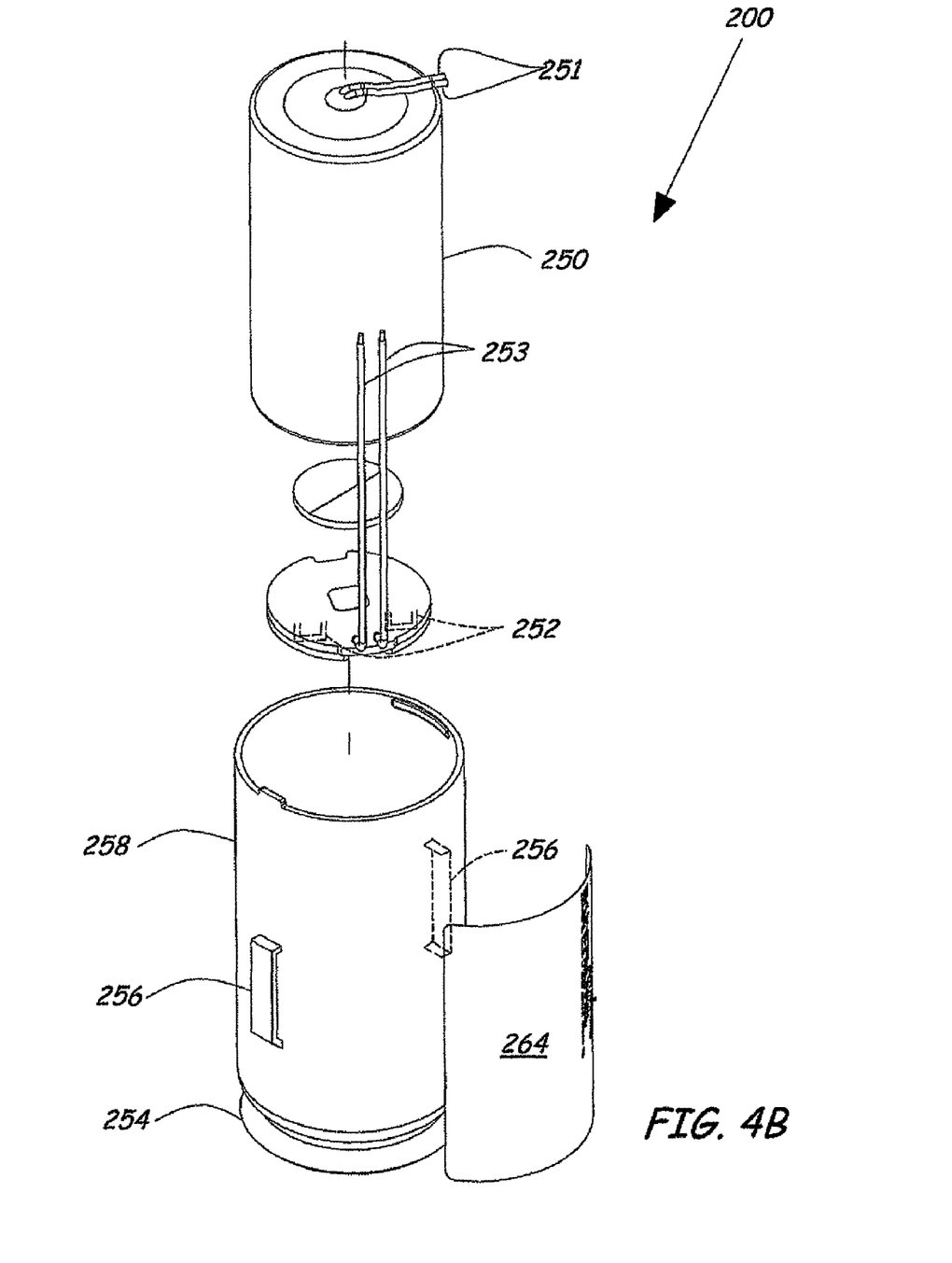

FIGS. 4A, 4B are exploded drawings of an exemplary replaceable module 200. The replaceable module 200 includes module contacts 254 that plug into the contacts 116 (FIG. 1A) in the second cavity 106 (FIG. 1A, 1B) to makes electrical connections with the measurement circuit assembly 108 (FIG. 1A). The module contacts 254 are surrounded by a seal 257. The module contacts 254 are mounted on a printed wiring board 255. The printed wiring board 255 connects to the primary battery 250 via leads 251. The printed wiring board 255 connects to the service communication connector 252 via leads 253. The replaceable module 200 includes a primary battery 250 that energizes the measurement circuit assembly 108. According to one embodiment, the primary battery 250 has one or more electrical cells. The replaceable module 200 includes a service communication connector 252 that is connectable by test hooks (not illustrated in FIGS. 4A, 4B) to service equipment (not illustrated in FIGS. 4A, 4B).

The replaceable module 200 includes a module outer shell 258. The module outer shell 258 includes alignment tabs 256 that engage alignment slots 128 (FIGS. 1A, 1B) that control alignment of plugging the contacts 254 into the contacts 116 (FIG. 1A). The module outer shell 258 includes the gripping ring 254 that is accessible (by removal of the second cover 102C in FIG. 1B) for gripping and pulling to unplug the replaceable module 200 from the contacts 116 (FIG. 1A).

The replaceable module 200 has a module cap 260 which is attached to the module outer shell 258. According to one embodiment, void spaces in the module outer shell 258 are filled with potting compound or the like and the module cap 260 is covered with a sealing ring 262 after the potting compound is applied. A label 264 is applied to the module outer shell 258 for identification and to indicate an expiration date of the primary battery 250. In one embodiment an O-ring is installed around the cap 260. This forms a seal at the bottom of the cavity 106 in FIG. 1B. This seal provides protection to the conductors from water or contaminants that enter cavity 106.

Figure 5:
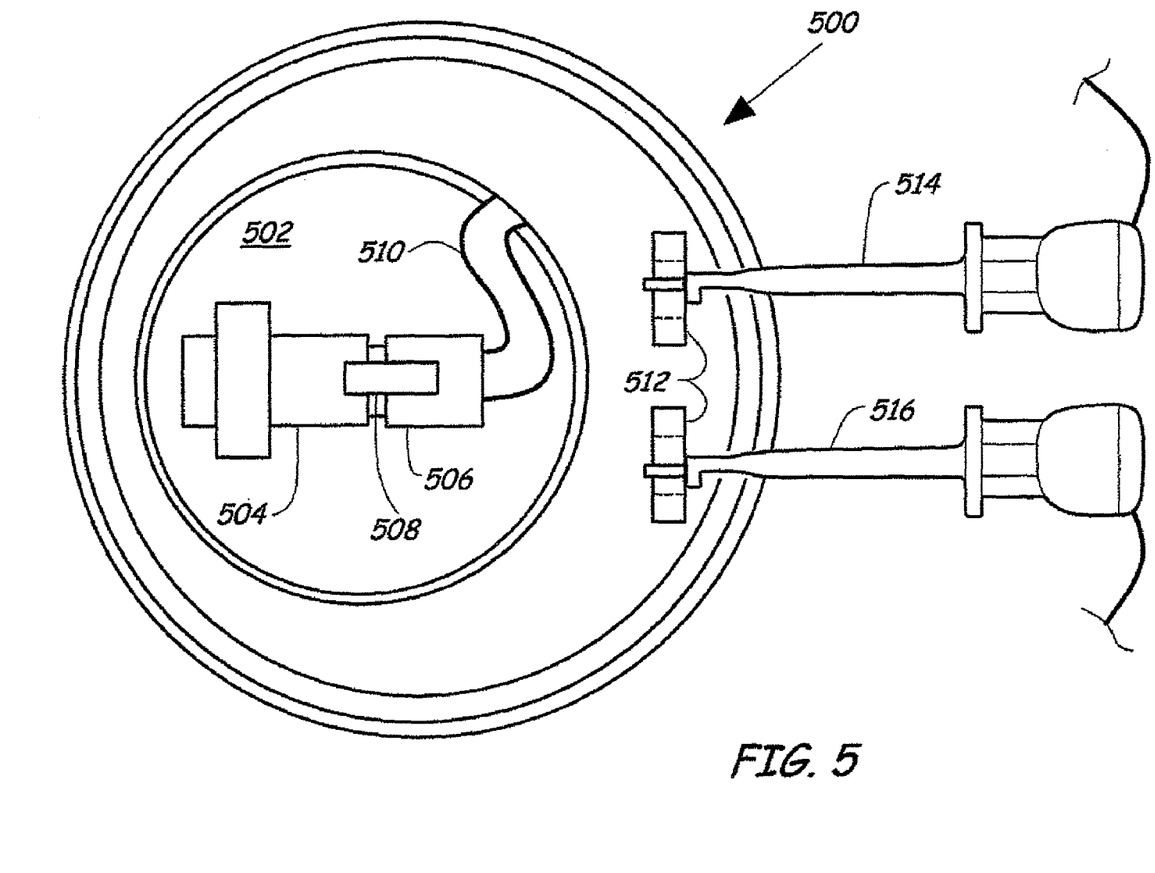
FIG. 5 is a front view of an alternative embodiment of a replaceable module.

FIG. 5 shows an alternative embodiment of a replaceable module 500. In the replaceable module 500, a primary battery 502 can be removed and replaced as a component that is separable from the rest of the replaceable module 500. The primary battery 502 includes a primary battery connector 504. The primary battery connector 504 mates with a module connector 506. The module connector 506 includes a latch 508 and connects with a cable 510 that connects the primary battery 502 with wiring in the replaceable module 500. The replaceable module 500 has a service communication connector 512. As illustrated in FIG. 5, the service communication connector 512 is adapted for connection to test hooks 514, 516 that connect to handheld portable service equipment (not illustrated in FIG. 5).

In the embodiments described above, the replaceable modules 120, 200, 500 are intrinsically safe and can be replaced in a contaminated environment and without removing the entire measurement transmitter from an explosive environment. The primary battery is encased in protective shell 158 which protects the primary battery 150 from cracking when dropped, and provides intrinsic safety. The replaceable module is suitable for use in Division 1 and Zone 0 areas. The replaceable module can be brought into a Class 1 or a Zone 0 area without a hot work permit.

Batteries with a life of 10 years or more can be used, and over this long period of time, primary battery contacts may be subject to fretting corrosion unless the primary battery contacts are secured against vibration. The use of the spring 127 reduces vibrations motion between the replaceable module 120 and the main housing body 102B so that fretting corrosion is reduced to allow 10 year or more of use. The replaceable module can be replaced in an explosive industrial atmosphere without violating intrinsic safety requirements. The spring 127 provides a force to the module to keep the pins and sockets of the interconnect from moving relative to one another. The spring 127 is sized to provide more force than can be generated by the mass of the power module under the greatest expected acceleration due to vibration.

Figure 6:
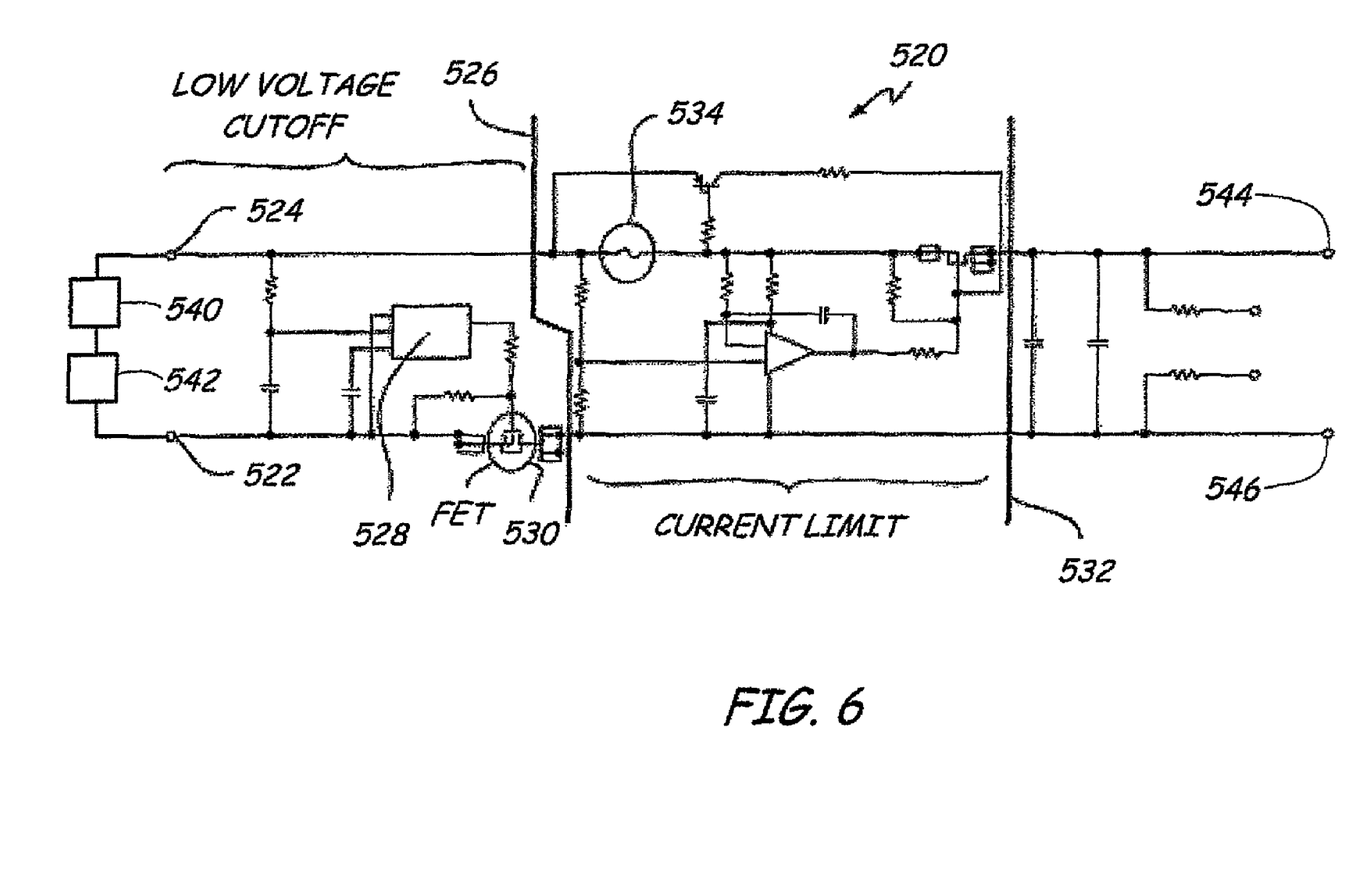
FIG. 6 illustrates a limiter circuit.

FIG. 6 illustrates an example of a limiter circuit 520. According to one embodiment, the limiter circuit 520 resides on a circuit board in a replaceable module (such as limiter circuit 152 in replaceable module 120 in FIG. 2). The limiter circuit 520 couples to multiple cells 540, 542 which are electrically connected in series as shown in FIG. 6. The limiter circuit 520 comprises terminations 522, 524 that couple to the cells 540, 542. Preferably, the spacing between components and circuit board traces in the limiter circuit 520 comply with intrinsic safety spacing requirements. As illustrated in FIG. 6, the limiter circuit 520 includes two primary portions.

A first portion from terminations 522, 524 through demarcation line 526 essentially provides a low voltage cutoff function. An output from supervisory circuit 528 drives a field effect transistor (FET) 530 to provide an open circuit when the battery voltage drops below a threshold of approximately 4 volts. The two cell battery pack 540, 542 initially provides approximately 7.2 volts. Thus, when the voltage of the battery pack 540, 542 drops below the threshold, the battery pack 540, 542 is effectively decoupled from the field device terminals 544, 546 due to open circuit provided by the FET 530.

A second portion of circuit 520 between demarcation line 526 and demarcation line 532 provides a current limiting circuit that helps protect a fuse 534 from excessive currents. The current limiting circuit protects the fuse 534 from blowing at currents above a fuse current limit (e.g., 0.25 ampere) but below a safe current limit for meeting intrinsic safety requirements. The current limiting circuit is particularly useful when the replaceable module is a one-time use (non-serviceable, non-reusable) module, since a blown fuse would require the entire replaceable module to be replaced before the end of the useful battery life. The limiter circuit 520 is particularly useful when higher battery voltage is present due to the use of multiple cells connected in series.

The replaceable module provides a robust, rugged impact resistant component suitable for use in an industrial environment. The replaceable module fits into a covered watertight cavity for protection from damage. According to one embodiment, the module outer shell can include internal ribs or the like to secure the primary battery without the use of potting compound. According to another embodiment, O ring seals can be used to allow for thermal expansion and to provide sealing. According to another embodiment, covers can be provided with threads that are buttress threads to provide superior creep resistance.

Although the present invention has been described with reference to preferred embodiments, workers skilled in the art will recognize that changes may be made in form and detail without departing from the spirit and scope of the invention.

What is claimed is:

1. A measurement transmitter for use in an industrial process to measure a process variable, the measurement transmitter comprising:
    a housing assembly that includes a main housing body with a first cavity closed by a first cover and a second cavity closed by a second cover;
    a measurement circuit assembly in the first cavity that includes power and service communication conductors that extend through the main housing body to contacts in the second cavity;
    a process variable sensor connected to the measurement circuit; and
    a replaceable module that plugs into the contacts in the second cavity and that comprises a primary battery and a service communication connector that is exposed for connection to external service equipment by removal of the second cover to allow service communications between the external service equipment and the measurement circuit.

2. The measurement transmitter of claim 1 wherein the measurement circuit assembly comprises a wireless antenna, and the wireless antenna radiates a wireless communication signal through at least one of the first cover and the housing assembly.

3. The measurement transmitter of claim 2 wherein the first cover comprises plastic resin that is transparent to the wireless communication signal.

4. The measurement transmitter of claim 2 wherein the wireless communication signal comprises a WirelessHART communication signal.

5. The measurement transmitter of claim 1 wherein the main body housing comprises a seal that seals the power and service communication conductors in an internal passage of the main housing body.

6. The measurement transmitter of claim 1 wherein the replaceable module comprises a gripping ring that protrudes beyond the second cavity such the gripping ring is accessible by removal of the second cover for pulling to unplug the replaceable module.

7. The measurement transmitter of claim 6 wherein the second cover comprises a cover cavity into which the service communication connector and the gripping ring protrude when the second cover is installed.

8. The measurement transmitter of claim 1 and further comprising a spring that is compressed between the replaceable module and the second cover.

9. The measurement transmitter of claim 1 wherein the replaceable module comprises protruding alignment tabs, and the second cavity comprises alignment slots that align with the alignment tabs to control alignment of plugging the replaceable module into the contacts in the second cavity.

10. A replaceable module for use with a measurement transmitter in an industrial process, comprising:
    a set of module connector contacts including service communication contacts and energization contacts adapted for connection with a wireless measurement transmitter;
    a module outer shell that comprises alignment tabs adapted to engage alignment slots in the wireless measurement transmitter such that the set of module connector contacts aligns with a set of wireless measurement transmitter contacts;
    a service communication connector adapted for connection to test hooks;
    a primary battery that is connected to the energization contacts; and
    conductors connecting the service communication connector to the service communication contacts to allow service communications between external service equipment and the measurement transmitter through the service connector on the replaceable module when the set of module connector contacts are aligned with the set of wireless measurement transmitter contacts.

11. The replaceable module of claim 10 wherein the module outer shell comprises internal ribs that secure the primary battery.

12. The replaceable module of claim 10 wherein the module outer shell is filled with a potting compound that secures the primary battery.

13. The replaceable module of claim 10 wherein the primary battery is removable and replaceable as a component that is separable from the rest of the replaceable module.

14. The replaceable module of claim 10 wherein the primary battery comprises a single cell.

15. The replaceable module of claim 10 wherein the primary battery comprises multiple cells.

16. The replaceable module of claim 10 wherein the set of module connector contacts are positioned on a printed wiring board.

* * * * *